2 Sheets—Sheet 1.

C. FLESCH.
PERMUTATION LOCK.

No. 62,191. Patented Feb. 19, 1867.

Witnesses:

Inventor:
Charles Flesch

2 Sheets—Sheet 2.
C. FLESCH.
PERMUTATION LOCK.
No. 62,191. Patented Feb. 19, 1867.
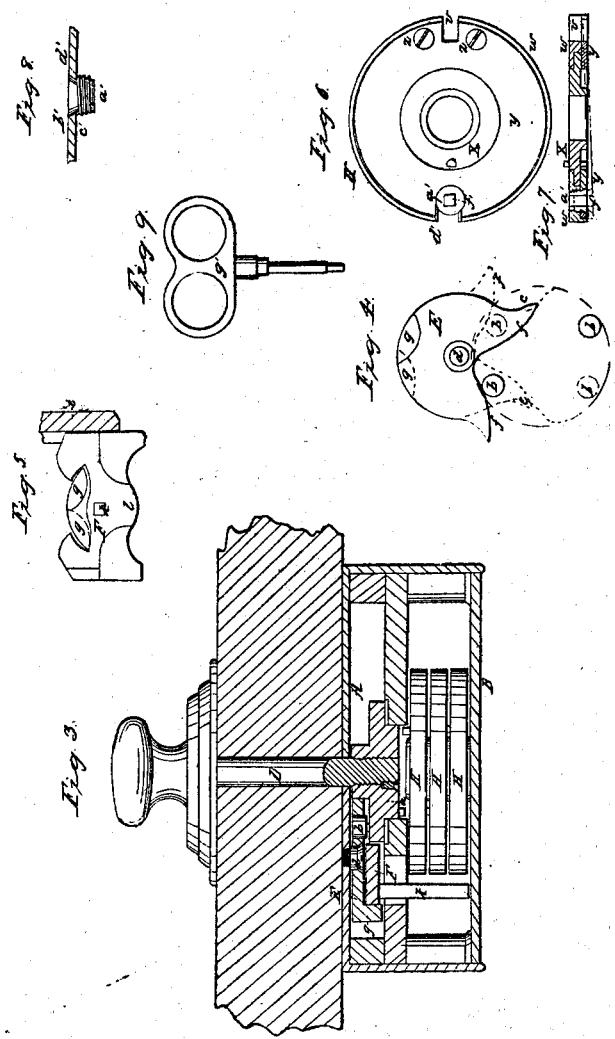
Witnesses:
Jay Hyatt
Inventor.
Charles Flesch

United States Patent Office.

CHARLES FLESCH, OF ROCHESTER, NEW YORK.

*Letters Patent No. 62,191, dated February 19, 1867.*

---

IMPROVEMENT IN PERMUTATION LOCKS.

---

The Schedule referred to in these Letters Patent and making part of the same.

---

TO ALL WHOM IT MAY CONCERN:

Be it known that I, CHARLES FLESCH, of Rochester, in the county of Monroe, and State of New York, have invented certain new and useful improvements in Locks; and I do hereby declare that the following is a full and exact description thereof, reference being had to the accompanying drawings, making part of this specification.

Figure 2:
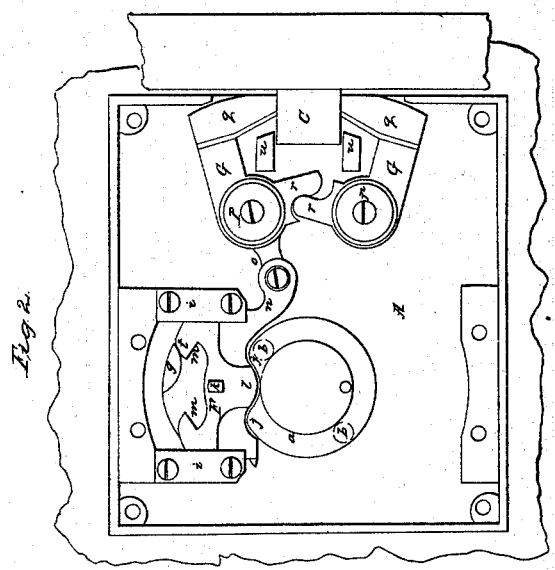
Figure 1:
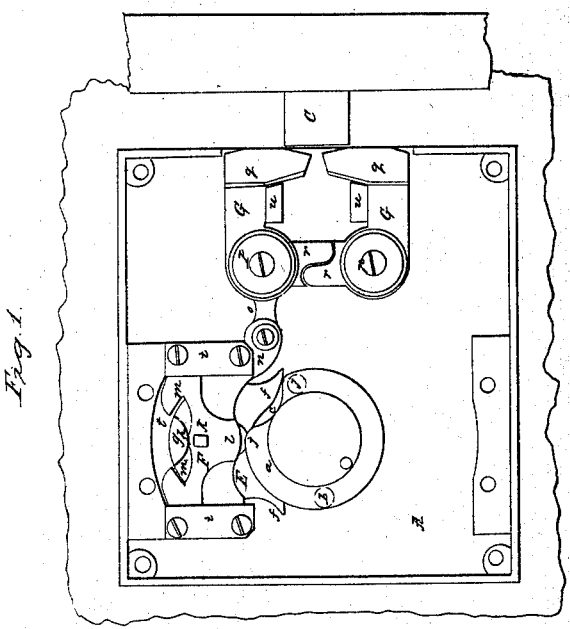

Figure 1 is an inner elevation of the mechanism locked.
Figure 2, a similar view unlocked.
Figure 3, a vertical cross-section through the key-shaft.
Figure 4, a diagram, showing the method of operating the oscillating-plate.
Figure 5, a diagram showing the method of operating the dog-plate.
Figures 6, 7, and 8, views showing one of the combination wheels, and the method of adjusting the centre.
Figure 9, view of the key for operating the screw for tightening the centres of the wheels.
Like letters of reference indicate corresponding parts in all the figures.

My improvements belong to that class known as combination or permutation locks. As represented in the drawing—

A is the case of the lock; B the back plate, which is removable; and C is the stem of the heavy bolt-work of the safe door, which is thrown in and out to lock or unlock the safe; the lock proper simply holding the stem out when locked, but allowing it to retreat when unlocked. The usual key-shaft, D, is employed, having a head, $a$, inside, substantially of the form shown, and projecting sufficiently to allow small rollers, or equivalent cams, $b\ b$, to be secured on the back side, as clearly shown in figs. 3 and 4. A depression, $c$, is also made in the edge of the head $a$, in the proper position for the end of the dog-plate to fall therein, as will be presently described, and on each side of this, small cams, $j\ j$. Above the rollers $b\ b$ is pivoted at $d$ an oscillating-plate E, having rounded parts or cheeks $f\ f$, which, as the rollers $b\ b$ strike them alternately, oscillate the plate back and forth. At the top of the oscillating-plate is a fly, $g$, of the diamond or double pointed form shown, which of course also oscillates with the plate. This fly projects over and moves in a slot, $h$, of a dog-plate, F, which slides up and down in ways or guides $i\ i$. The slot $h$ is open at the top, a little more than the major diameter of the fly; and at opposite extremities it has indentations or cavities, $m\ m$, into which the fly strikes at the extremes of its strokes, and thus holds the dog-plate in an elevated position. It also has a cam surface, $t$, for the fly to strike on, in unlocking the device, as will presently be described. The dog-plate is provided with the ordinary dog $k$, that strikes into the notches of the combination wheels as usual, and it also has a rounded extremity, $l$, that falls into the depression $c$ of the head of the key-shaft, when the dog falls in the notches. It will be seen that the dog-plate can fall to allow the dog to enter the notches of the wheels only when the fly is centred in the slot $h$, as shown in fig. 1; at all other times, the fly striking into the indentations $m\ m$, will hold the dog-plate away from the wheels, and in turning to the right, or away from the stem C of the heavy bolt-work, the fly is thus centred only when one or the other of the cam points $j\ j$ comes directly under the extremity $l$ of the dog-plate, which thus catch said plate and still hold it up. But in turning in the opposite direction, or towards the stem of the heavy bolt-work, when the suitable time comes, the depression $c$ will come in coincidence with the central portion of the fly in the slot, and then the dog will drop in the notches of the wheels, and the parts can be unlocked. The dog-plate is provided with a projection, $n$, jointed to a similar projection, $o$, of one of a pair of jaws, G G, pivoted at $p\ p$. The heads $q\ q$ of these jaws are made to approach each other, and to strike together when the lock is locked, and thereby form a stop to hold the stem C out, as shown in fig. 1, but to separate or open, to admit the said stem when unlocked, as shown in fig. 2. This action is accomplished by means of right-angled arms, $r\ r$, of said jaws, forming toggle-levers of the form substantially as shown. The jaws receive their motion to unlock by reason of the fly $g$ striking over the cam surface $t$ of the dog-plate, thereby throwing said plate down by positive force; and the fly is thus enabled to strike over said cam surface by reason of a slight vertical play at the joints $n\ o$. The jaws are again closed by means of the cams $j$ striking the extremity $l$. The motion of the jaws in striking together is limited by fixed stops, $u\ u$. The combination wheels H H H are secured on a bearing, forming part of the back plate B, and are provided with the usual notches $v\ v\ v$, for the dog $k$ to strike into when in the proper position. These wheels are each made of a body, $w$, and a centre, $x$, as usual, and also a rim or ring $y$, which fits in the back of the body and clamps down upon the centre $x$, to hold it in any given position. In order to thus clamp the centre effectually, I prefer to insert ordinary screws, $z\ z$, on one side, and a conical or other shaped screw, $a'$, at the other. To insert this screw so that it shall relieve the rim $y$ from pressure on the centre, when it is desirable to change the combination, I would make the screw with two shoulders, $b'\ c'$, at the head, with a groove between, and this groove I slide into a slot, $d'$, made in the edge of the rim, of just such width as to receive it, but still allow the shoulders $b'\ c'$ to hold above and below. Thus it will be seen that as the screw is screwed in the rim is tightened down upon the centre, and as it is screwed out the rim will be drawn back, by reason of its natural spring, sufficiently for the centre to be changed. The screw $a'$ is provided with a square socket, $f'$, in which fits a key, $g'$, inserted from the outside of the lock. When the wheels are all properly adjusted on a line, this key is inserted through the screws, and the latter loosened, when the shaft D is turned, thereby adjusting the centres $x\ x$, as may be desired; and the screws are then tightened down again, thereby setting the wheels, without opening the lock. If desired that portion of the rim which clamps down upon the centre may be provided with a small rib or ridge to strike still harder, but under ordinary circumstances this is not necessary.

What I claim as my invention, and desire to secure by Letters Patent, is—

1. The combination of two jaws, G G, connected by the toggle-levers $r\ r$, or equivalent, operating substantially as and for the purpose herein set forth.

2. The combination of the dog-plate F, with the jaws G G, operating substantially as and for the purpose specified.

3. The combination of oscillating fly $g$, with the dog-plate F, or equivalent, operating in such a manner as to allow said plate to fall when centred, but to hold it elevated at all other times, as specified.

4. The combination of the rollers or cams $b\ b$, of the head $a$, with the oscillating-plate E, operating substantially as and for the purpose set forth.

5. So connecting the head $a$, with the dog-plate F, or equivalent, that in turning from the bolt, said plate will only touch the cam points $j\ j$, but in turning toward the bolt the dog will be allowed to fall to unlock the device, substantially as set forth.

6. Clamping the centre of the combination wheels in place, by means of a rim $y$, tightened or loosened by a screw, $a'$, or equivalent, as set forth.

7. Connecting the screw $a'$ with the rim $y$, by means of the shoulders $b'\ c'$, or equivalent, and the slot $d'$, in such a manner that the rim is attached to and rises with the screw, substantially as specified.

In witness whereof I have hereunto signed my name in the presence of two subscribing witnesses.

CHARLES FLESCH.

Witnesses:
JAY HYATT,
DOMINIK FISHER.